United States Patent [19]

Woodberry et al.

[11] 4,022,648

[45] May 10, 1977

[54] BONDING OF ORGANIC THERMOPLASTIC MATERIALS

[75] Inventors: Paul T. Woodberry, Reading, Mass.; Donald G. Wilson, Indianapolis, Ind.

[73] Assignee: P. R. Mallory & Co., Inc., Indianapolis, Ind.

[22] Filed: Feb. 7, 1975

[21] Appl. No.: 548,054

Related U.S. Application Data

[63] Continuation of Ser. No. 278,321, Aug. 7, 1972, abandoned, which is a continuation of Ser. No. 94,813, Dec. 3, 1970, abandoned, which is a continuation-in-part of Ser. No. 638,123, May 12, 1967, abandoned.

[52] U.S. Cl. .................................. 156/273; 156/306
[51] Int. Cl.² ......................................... B29C 19/04
[58] Field of Search .......................... 156/272–275, 156/380, 306

[56] References Cited

UNITED STATES PATENTS

| 2,706,165 | 4/1955 | Korsgaard ........................ 156/272 |
| 3,589,965 | 6/1971 | Wallis et al. ..................... 156/272 |
| 3,647,592 | 3/1972 | Woodberry ....................... 156/272 |
| 3,755,043 | 8/1973 | Igarashi et al. .................. 156/272 |

*Primary Examiner*—Douglas J. Drummond
*Attorney, Agent, or Firm*—Hoffmann, Meyer & Coles

[57] ABSTRACT

An organic thermoplastic resin having dielectric properties is bonded to a substrate material by heating the plastic, bringing it into contact with the substrate, and applying an electric potential therethrough so as to join the plastic and the substrate together. The substrate material may be an electrical conductor such as a metal sheet or foil, or it may be a plastic of similar or dissimilar chemical composition or a glass or other dielectric.

21 Claims, 6 Drawing Figures

INVENTORS
PAUL T. WOODBERRY
DONALD G. WILSON

BONDING OF ORGANIC THERMOPLASTIC MATERIALS

This is a continuation of Ser. No. 278,321, filed Aug. 7, 1972, now abandoned which is in turn a continuation of Ser. No. 94,813, filed Dec. 3, 1970, now abandoned, which was in turn a continuation-in-part of Ser. No. 638,123, filed May 12, 1967, now abandoned.

The commercial importance and wide range of uses of the plastic bonding art have given rise to a number of methods of forming a bond between a plastic and other materials, such as metals, glasses and other plastics. Conventional practices for accomplishing these results may be grouped into three general categories. First, the welding (or fusing) processes are for the most part analogous to those used for the welding of metals. In the "hot gas" method, for example, a torch heats a stream of compressed, nonreactive gas which is then directed onto adjoining areas of the pieces to be fused in order to soften or melt them; mechanical pressure and/or a filler rod may be applied to the heated area to complete the bond. Other welding processes employ heated tools, mechanical friction or ultrasonic energy to generate the necessary local heat and pressure. Dielectric heating has been utilized by holding the pieces between the electrodes of a high-frequency power generator. Fusion has also been accomplished without the use of heat by partially dissolving adjacent areas of the pieces in a suitable solvent and applying mechanical pressure to the pieces. Commercially, welding or fusion is commonly employed to create bonds between two pieces of plastic, usually of identical composition.

Adhesives form a second category of bonding agents. Many different types of suitable adhesives exist for forming both chemical and mechanical bonds between the pieces to be joined. Monomolecular layers of adhesive have also found applications in this field. The use of adhesives, however, tends to make the bonding operation more complicated and expensive, since the adhesive must be prepared and applied to the surfaces and since preparation of these surfaces is usually required.

A third category of bonding methods, particularly applicable to the manufacturing of laminiated products, involves the application of large amounts of heat and mechanical pressure over substantial areas of the pieces to be joined. These methods are commonly used to produce laminates of plastic and a substrate of a dissimilar material, such as metal or glass. A typical bond between an aromatic polymer film and a sheet of steel or aluminum requires temperatures in the range of 750° F and pressures up to 6000 psi, and usually requires some surface preparation, such as sandblasting or chemical etching of the metal surfaces, in order to provide sufficient mechanical bonding of the plastic thereto.

The bonding method of the present invention distinguishes itself from the foregoing conventional methods by, inter alia, its use of an electric potential established through a heated organic thermoplastic, which is a dielectric material, and the substrate material in order to create and promote a bond between such plastic and such substrate material. The substrate material may be an electrical conductor, semiconductor, or insulator, bonding has been achieved with substrates of metals, glass, plastics of similar and dissimilar compositions and other materials.

It is therefore an object of the present invention to provide a process for bonding an organic thermoplastic dielectric material to a substrate by the use of an electric potential to establish and to promote the formation of a bond in situ.

Another object of the invention is to provide bonding in a laminated structure between a plastic sheet or film and another material by the application of an electric potential therethrough.

A further object is to provide a strongly bonded composite structure having a thermoplastic material as an element thereof, wherein the bond is formed by the application of heat and the electric potential through the structure.

Still a further object of the invention is to provide means and instrumentalities for the bonding of thermoplastic dielectric materials.

Other objects and advantages of the present invention and the nature thereof will become apparent from the following description considered in conjunction with the accompanying drawings, wherein.

Figure 5:
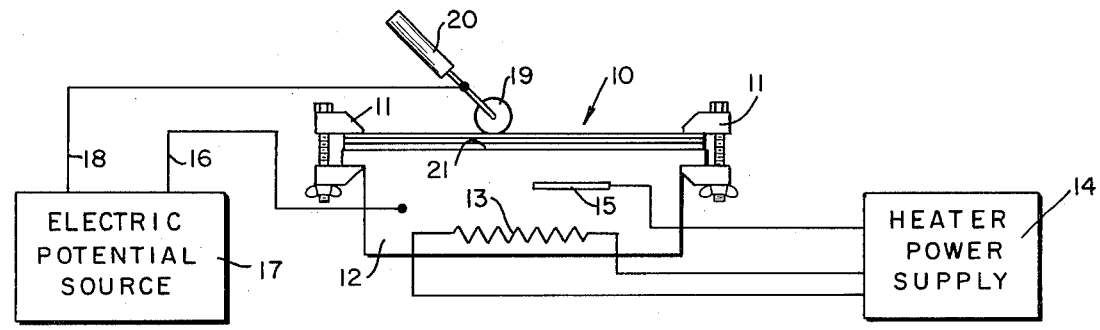
FIG. 5 shows a means for practicing the invention in partially schematic elevation.

Briefly, the method of the present invention creates or forms a bond between a thermoplastic dielectric material and a substrate material by heating the plastic and applying an electric potential therethrough. The bond formed can have a bond strength, that is, a tensile strength greater than about 50 psi, and the tensile strength can be as great as 300 to 400 psi or even higher. As used herein, the word "substrate" denotes the entire composite structure to be bonded except for the bondable thermoplastic material necessary to the invention. Therefore, the substrate may consist of a single homogeneous material or it may be a previously or contemporaneously bonded composite structure. Furthermore, the substrate may itself be a plastic within the terms of the invention; for instance, in referring to a laminate all of whose layers are organic thermoplastic dielectrics, all but one of the layers will be referred to as the substrate. Although the description of the invention will involve laminated structures composed of thin sheets or strips of the constituent materials, it will be understood that the invention is not limited thereto; the laminate embodiment has been selected for clarity of description and because of its commercial importance.

The thermoplastic material may be heated for bonding by conduction, convection or radiation. Although only the plastic need be heated, as a practical matter it will usually be convenient to heat all or part of the substrate as well. The temperature attained by the plastic is sufficient to cause it to be deformed to some extent under the influence of the electric potential and to promote, thereby, contact of the thermoplastic with the substrate material. In all instances of bond formation, the temperatures used in combination with the effect of the applied electric potential are sufficient to cause the thermoplastic to wet the surfaces of the substrate.

The strength and method of application of the electric potential will vary with the shape, size and composition of the plastic and of the substrate. Again, as a practical matter, the potential will normally be applied by connecting a source of electric potential to a pair of electrodes stationed at opposite surfaces of the desired composite or laminate. Any external layer of the composite which is an electrical conductor may, of course, itself serve as an electrode. The bonding is a function of the applied electric potential and the temperature and the values will vary dependent upon the particular film composition. In addition, the time required for the application of electric potential and temperature to form a bond will vary and will usually be no greater than about 30 minutes, with times of a few minutes (about 2 to 10 minutes) being typical.

In the case of films generally available, the voltage will be in the range of about 500 to 3000 volts and the temperature within the range of about 100° C to 300° C. In certain instances, however, the voltage may be as low as 100 or 300 volts. Additionally, in certain instances, the temperature can be as high as 400° C or even higher.

It is believed that the bond can be, in part, a mechanical bond formed by filling in and wetting of the substrate surface irregularities by the thermoplastic materials. It also means that electrical heating of the composite by the applied voltage is of small effect, generally amounting to less than 120 milliwatts per square centimeter of the laminate. The application of an electric potential has been found to promote wetting of a substrate by a thermoplastic at temperatures appreciably lower than is the case when heat alone is used. The establishment of a bonded composite at these lower temperatures avoids the marked dimensional changes that can occur when plastics are subjected to high temperatures during a bonding process.

The process of the present invention can be carried out with thermoplastic synthetic resins. The term "thermoplastic" as used throughout the specification and claims includes in its definition synthetic resins which can be reversibly softened at least once by application of heat.

Examples of thermoplastic resin structures which can be bonded to like or to different substrates by the process of the present invention include: polyamides, such as nylon 6, nylon 610 (e.g. polyhexamethylene adipamide, polycaprolactam); polyimides; polyesters, such as phthalates and terephthalates (e.g. polyethylene terephthalate); polyacrylates and polymethacrylates; vinyl polymers, as for example polyvinylchloride, polyvinylbuytral, polyvinylfluoride; and polyolefines such as polypropylene, polyethylene and halogenated polyolefines such as polychlorotrifluorethylene and polyperfluoroethylene.

Substrate materials which can be used in accordance with the process of the present invention include the foregoing thermoplastic polymeric resins, glasses, ceramics and metals. Metals which have been employed include copper, nickel, silicon, aluminum and molybdenum, and alloys of the same as well as other alloys, such as Kovar (an alloy of cobalt, nickel, manganese and iron). The substrate can be of a single homogeneous layer of a material, or can be a composite, such as a laminate of various materials. The compositing of the laminated substrate can be carried out simultaneously with the process of the present invention if the laminated substrate is a composite of several layers of thermoplastic resins, or if the laminated composite substrate comprises at least one layer of a thermoplastic resin contacting or alternating between several non-thermoplastic substrate layers.

Figure 2:
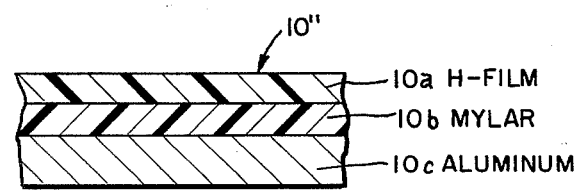
FIG. 2 is an enlarged cross section of a plastic-plastic-metal laminate.
Figure 1:
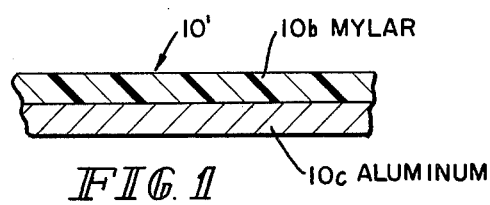
FIG. 1 is an enlarged cross section of a plastic-metal laminate in accordance with the invention.
Figure 3:
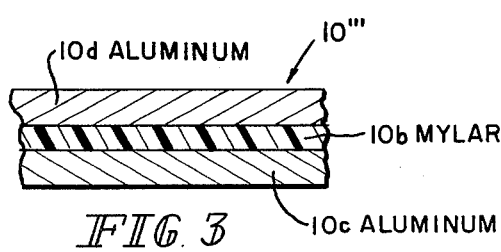
FIG. 3 is an enlarged cross section of a metal-plastic-metal composite.
Figure 4:
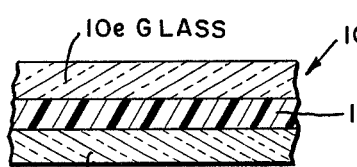
FIG. 4 is an enlarged cross section of a glass-plastic-glass laminate.

The temperatures and potential differences required for bonding will, of course, vary with the thickness of the materials, their composition, their application times, and other factors, so that no general rule can be given. FIG. 1 shows an example of a Mylar-aluminum laminate $10'$, Mylar being the trademark of E. I. duPont de Nemours & Co. for polyethylene terephthalate film. The Mylar, about one-half mil thick having a polarized molecular structure, was heated to 200°–240° C and an 800 volt potential difference was established through the Mylar sheet $10b$ by using a graphite roller as one negative electrode and the aluminum sheet $10c$ as the positive electrode. Rollers of other conductive material such as brass have also been employed. The roller was passed over the entire surface of the hot Mylar sheet until a continuous bond was formed. Another similar example is the bonding of H-film, 1 mil thick, to a substrate of silicon, 10 mils thick, at a temperature of 400° C and an electric potential of 200 to 300 volts. The H-film is a polyimide film sold under the trademark KAPTON by E. I. du Pont deNemours & Co. referred to heretofore. A laminate having two simultaneously-formed bonds is illustrated in FIG. 2. This H-film-Mylar aluminum composite $10''$ was similarly bonded by heating it to 230° C in the presence of an 800 volt potential difference. The thicknesses of the films were Mylar — ½ mil, aluminum — 2 mils and H-film — 1 mil. The Mylar film $10b$, formed strong bonds both to the H-film $10a$ and to the aluminum $10c$. FIG. 3 shows an aluminum-Mylar-aluminum laminate $10'''$ such as might be used for, e.g., an electrical capacitor. Here, the aluminum foils $10c$ and $10d$, each 0.001 inch thick, and the Mylar film $10b$, 0.0006 inch thick, were heated to 150° C; a 1400 volt potential difference was applied and the heating continued in the presence of the potential until the laminate reached 175° C. The potential was then removed and the bonded laminate cooled to room temperature. Tests of this structure as a capacitor revealed a low leakage and dispersion factor, indicating that the Mylar film was not damaged chemically or physically by the bonding process. This laminate also illustrates that the substrate (here the two aluminum foils) need not lie entirely on one side of the thermoplastic material. FIG. 4 is a cross section of a glass-Mylar-glass composite $10''''$, the Mylar being 0.0005 inch thick, and the glass layers $10e$ and $10f$ each being approximately 0.06 inch thick. This structure was bonded by heating it to 180° C in the presence of a 2200 volt potential difference and subsequently cooling it to room temperature with the field removed.

Still considering, for clarity of description, a bonded structure in the form of laminated sheets, films or foils, FIG. 5 illustrates a simplified form of apparatus for accomplishing a bond in accordance with the present invention. An unbonded composite, indicated generally by the numeral 10, is secured by a clamping means 11 to a bed 12, here shown to be solid and made of a thermally and electrically conductive material such as aluminum or steel. A controllable heater such as an electrical resistance heating element 13 is fed from a power supply 14, its temperature being regulated by a thermostat 15. The bed 12 is also connected to one polarity 16 of a source 17 of electrical potential; an opposite polarity 18 of the source 17 is connected to a conducting cylinder or roller 19 which is movable over the extent of the laminate 10 by means of a handle 20.

Bonding is accomplished in the apparatus of FIG. 5 by heating the laminate 10 to the desired temperature through the surface 21 of the bed 12 and by applying an electric potential across the laminate, using the roller 19 and the surface 21 as electrodes. The roller 19, which may conveniently be of brass or graphite, is then passed over the laminate 10 in order to expose the potential successively to the entire area of the laminate or to selected portions thereof; that is, only a restricted area of the roller 19 is in use at any single time. The electrodes 19 and 21 are shown in direct contact with the laminate 10 in FIG. 5. In some cases, however, it is desirable to coat the electrodes with a release agent, such a silicone grease, to prevent bonding of the electrodes to the laminate; in these cases, the electrodes will be in proximity with the laminate. In certain other cases also, a proximate instead of a direct contact is established; for instance, in the aluminum-Mylar-aluminum composite described above and shown in FIG. 3, the electrode 21 is in direct contact with the substrate layer 10c but the electrode 19 is separated from the plastic film 10b by the substrate layer 10d. It will be noted that a mechanical pressure can be exerted on the roller 19 by means of the handle 20. Such pressure urges the plastic into close contact with the substrate, and is frequently desirable for smoothing out any wrinkles or gross imperfections which may arise.

Figure 6:
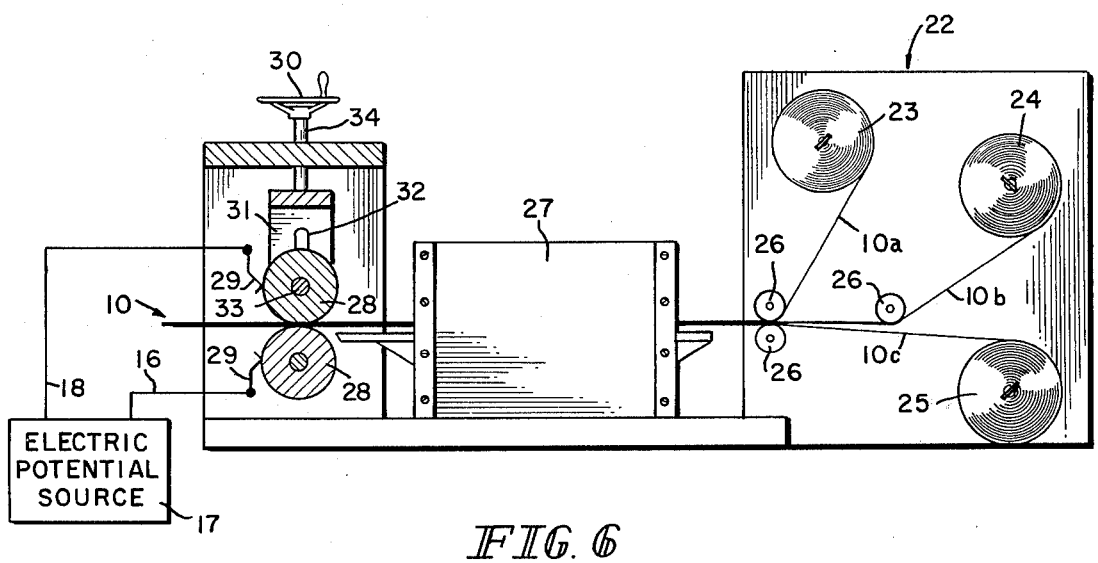
FIG. 6 is an elevational view in partial cross section of a second means for practicing the invention.

FIG. 6 illustrates an apparatus for the production of laminated strips according to the invention. A conventional spool-fed supply means 22 contains a plurality of spools 23, 24 and 25 which provide a continuous feed of the strips 10a, 10b and 10c of the laminate 10. The strips are directed and placed into contact with each other by the guide rollers 26. The strips then pass through a conventional heater 27 in which they are heated to the required temperature by conduction, convection, radiation, or any convenient combination thereof. Upon leaving the heater 27, the as yet unbonded laminate 10 passes between a pair of conductive roller electrodes 28. An electric potential is applied across the laminate by connecting the polarities 16 and 18 of the source 17 of electric potential to the rollers 28 with the spring pressure contacts 29. Successive portions of the laminate 10 are thus bonded as they come into proximity with the restricted area of the rollers 28 between which the electric potential exists. The thermal efficiency of the apparatus may be increased by obvious expedients which have been omitted for clarity of description; for instance, the rollers 28 might be heated to maintain the temperature of the laminate during application of the field, or these rollers might be physically incorporated into the heater 27. Also, in some cases it will be desirable to coat one or both of the rollers 28 or the laminate 10 wih a release agent, as was noted previously.

FIG. 6 shows a handwheel 30 and a yoke 31 for controlling the vertical position of the upper roller 28. In most cases, dependent upon the character of the upper roller, the weight thereof will be sufficient to apply adequate pressure to the composite strip 10 and the yoke 31 has vertical slots 32 in which the axle shaft 33 of the roller may float vertically. If the upper roller 28 is lightweight and further pressure is desirable, the axle shaft may be fixed vertically in the yoke and a spring inserted between the screw shaft 34 and the yoke 31. This pressure, exerted normal to the direction of feed, has the effect of urging the strips into close contact with each other. Such pressure also allows the rollers to be driven (by means not shown) in order for them to act as a take-up means for pulling the strips through the heater 27. Furthermore, the tension on the strips achieved by pressures on the driven rollers 28 serves to eliminate imperfections from the bond which might otherwise arise from wrinkling or skewing of the strips or from other causes.

Having thus described and explained several preferred embodiments of our invention, we claim:

1. A method of bonding an organic thermoplastic dielectric material to a substrate, comprising the steps of juxtapositioning surfaces to be bonded of said material and said substrate, applying sufficient heat to said material to cause softening thereof, employing a source of electric potential to established a region of electric potential between two electrodes wherein said region of electric potential further comprises an electric field, applying said region of electric potential to said juxtaposed surfaces for a time sufficient to draw said surfaces together to form a bond therebetween, and cooling said bonded surfaces with said region of electric potential removed.

2. The method of claim 1 wherein the thermoplastic material is heated to a temperature in the range of from about 100° C to about 400° C and the region of electric potential is applied in the range of about 100 volts to about 3000 volts.

3. The method of claim 1, wherein said thermoplastic material has the form of a thin sheet or strip.

4. The method of claim 1, wherein said substrate is a thin sheet or strip.

5. The method of claim 1, wherein said substrate is a metal.

6. The method of claim 1, wherein the substrate is selected from the group consisting of Al and Si.

7. The method of claim 1, wherein said thermoplastic material is taken from the group consisting of polyamides, polyimides, polyesters, polyacrylates and polymethacrylates, vinyl polymers and polyolefines.

8. The method of claim 2, wherein said thermoplastic material is a polyethylene terephthalate.

9. The method of claim 2, wherein said thermoplastic material is a nylon.

10. The method of claim 2, wherein said thermoplastic material is a fluorinated copolymer of ethylene and propylene.

11. The method of claim 1, wherein said substrate is an organic plastic material.

12. The method of claim 1, wherein said substrate is a laminate having a layer of metal and a layer of organic plastic material.

13. The method of claim 1 including the further step of applying pressure to said surfaces to be joined to urge said surfaces into close contact while applying the region of electric potential to the surfaces.

14. The method of claim 1, wherein said substrate is at a positive electric potential and said material is at a negative electric potential.

15. A method of bonding an organic thermoplastic dielectric material to a substrate comprising the steps of juxtapositioning surfaces to be bonded of said material and said substrate, applying sufficient heat to said material to cause softening thereof, employing a source of electric potential to create an electric potential of one polarity at said substrate and an electric potential of an opposite polarity at said material to establish a region of electric potential between the juxtaposed surfaces of said material and said substrate wherein said region further comprises an electric field, applying said region of electric potential to said juxtaposed surfaces for a time sufficient to deform said softened material to substantially conform to the surface irregularties of said substrate to form a bond therebetween, and cooling said bonded surfaces with said region of electric potential removed.

16. The method of claim 15, wherein the thermoplastic material is heated to a temperature in the range of from 100° C to about 400° C and the region of electric potential is applied in the range of about 100 volts to about 3000 volts.

17. The method of claim 15, wherein said thermoplastic material has the form of a thin sheet or strip.

18. The method of claim 15 wherein said substrate is a thin sheet or strip.

19. The method of claim 15, wherein said substrate is a metal.

20. The method of claim 15, wherein the substrate is selected from the group consisting of Al and Si.

21. The method of claim 15, wherein said thermoplastic material is taken from the group consisting of polyamides, polyimides, polyesters, polyacrylates and polymethacrylates, vinyl polymers and polyolefines.

* * * * *